UNITED STATES PATENT OFFICE 2,602,940

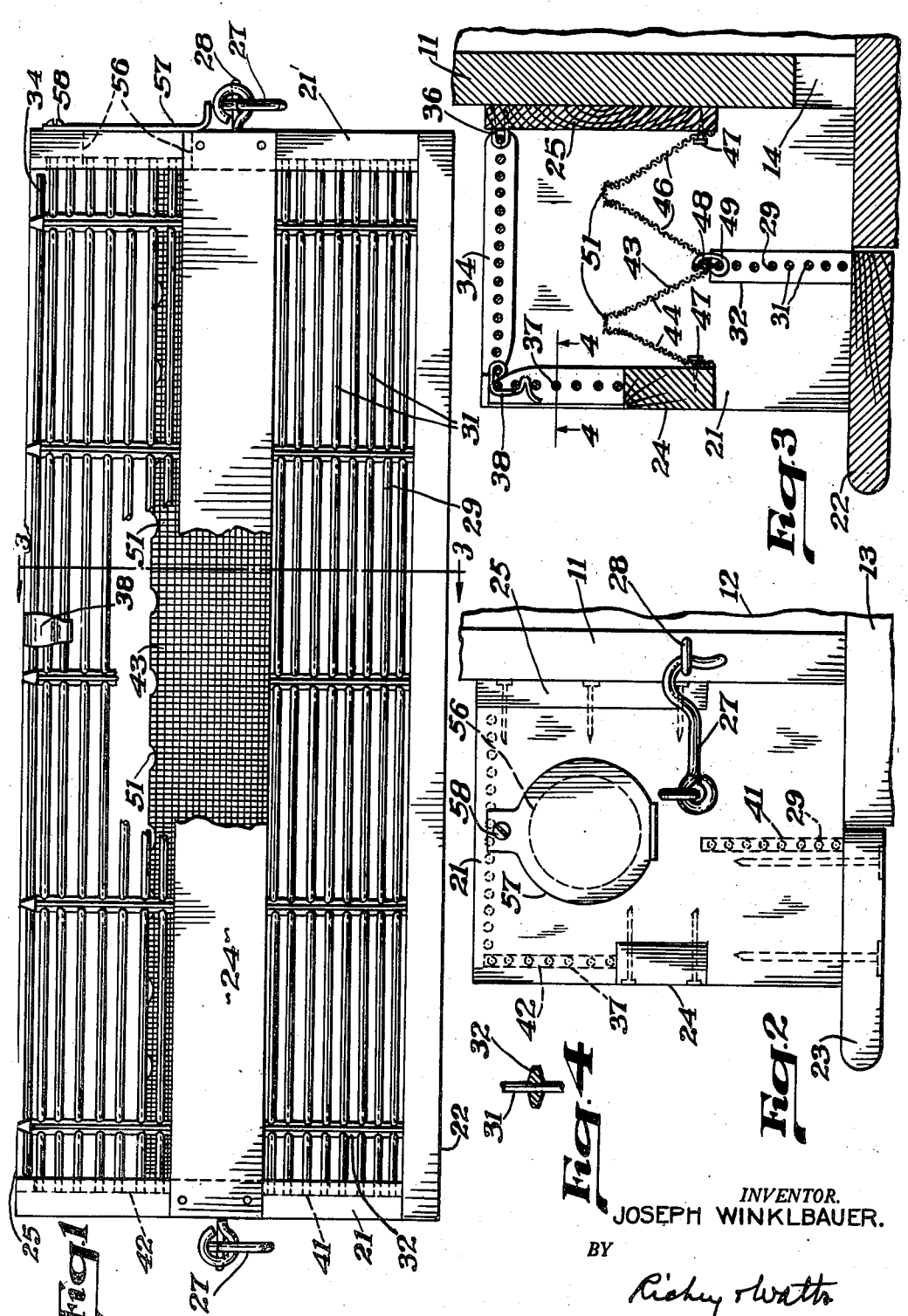

DRONE TRAP

Joseph Winklbauer, Willoughby, Ohio

Substituted for application Serial No. 784,810, November 8, 1947. This application August 17, 1949, Serial No. 110,806

2 Claims. (Cl. 6—4)

This invention relates to the art of beekeeping and more particularly to the segregation and trapping of drones and queens and the exclusion of drones from hives. The invention is more particularly directed to a trap which will trap drones and queens either entering or leaving a hive.

As is well known, drone bees are usually produced in much greater numbers than needed, and, since the drones produce no honey, but eat a great deal of it, efficient beekeeping requires the elimination of the greater portion of drones.

It is also important that when a swarm occurs the queen be controlled, so that the swarm will not escape and may be installed in a new hive according to the desires of the apiarist.

In view of these facts, traps for drones and queen bees have been hitherto proposed, which depend for their action upon the fact that drones and queens are much larger than worker bees. By virtue of this fact a trap may be placed at the entrance to a hive, the trap including a bypass provided with openings small enough to permit free passage of the workers, but impassable for the drones and queens, which are diverted into the trap.

So far as I am aware, such previously known traps have been effective only to trap drones and queens emerging from the hive and to exclude visiting drones from the hive.

My invention provides a device which is effective not only to exclude, but also to trap visiting drones. Since it is customary for drone bees to travel from hive to hive the invention presents the very great advantage that a trap placed on one of a number of hives is effective to trap drones from all the hives.

In addition to this primary advantage, the trap, according to the invention, presents other improvements and advantages over traps previously known to me in that it is arranged so that the visiting drones quickly pass into the trap and thus do not impede the access of the workers to the hive. Moreover, the trap is very easy to empty of the entrapped drones.

The objects of the invention will be apparent from what has been stated, and the preferred manner of attaining these objects will be clear to those skilled in the art from the description of the preferred embodiment of the invention in this specification and in the appended drawings in which Fig. 1 is a front elevation of the trap according to the invention with parts cut away; Fig. 2 is a side elevation of the same; Fig. 3 is a cross-sectional view taken along the line 3—3 in Fig. 1; and Fig. 4 is a detail sectional view taken on the plane 4—4 indicated in Fig. 3.

The drawings illustrate the trap to a somewhat reduced scale, the overall length of the trap being preferably the same as the width of the hive to which it is attached in use. The trap is shown mounted on a hive in Figs. 2 and 3, in which a fragmentary part of the hive is shown comprising portions of the front wall 11, a side wall 12, and a bottom or floor 13 which projects beyond the front wall to constitute a landing board for the bees. The front board is cut away across most of the width of the hive to provide an entrance gate 14.

While the tray may be made from any suitable material, conveniently the principal frame members of the hive are of wood and comprise end plates 21 and 21', a bottom board 22 which projects outwardly beyond the end plates to constitute a landing board portion 23, and front and rear frame members 24 and 25, respectively, joining the end plates. These frame members may be secured together by nails or in any other suitable manner.

The frame members 21 and 21' and 25 rest against the front board 11 of the hive and the trap is supported by engagement of the side plates 21 and 21' with the landing board of the hive. The lower cross member 23 constitutes an extension of this landing board. The trap may be retained in any conventional manner, preferably by a hook 27 pivoted to each of the end plates engaging in a screw eye 28 screwed into the hive.

The normal route for worker bees through the trap lies between the front board 24 and the bottom board 22 and through the hive entrance 14. This entrance is obstructed by a barrier 29 composed of wires 31 held in accurate spaced relation by transverse bars 32. The specific mode of fabrication of the grid 29 is immaterial to the invention. The wires may be passed through holes drilled in the spacer bars. It is important, of course, that the width of the space between the adjacent bars 31 be accurately controlled so that the spacing is sufficient for worker bees, but too small to allow passage of the larger drones and queens. I have found a spacing of three-sixteenths of an inch suitable. The round surface of the wires 31 is believed to be desirable as opposed to any structure presenting a sharp or angular surface. The barrier 29 extends from the bottom board 22 approximately to the level of the lower edges of the front and rear cross-members.

The space between the members 24 and 25 constitutes the trap portion of the device, enclosed at the top by a grid 34, which may be of the same type of construction as the barrier 29, and which is preferably hinged to the rear frame member 25 as by staples 36 so that the top may be opened to clean out the trap.

The front of the trap above the member 25 is likewise enclosed preferably by a grid 37 which may be of a character similar to the grids 29 and 34. The upper part of the trap should be largely open to admit light and air so that the bees to be trapped will ascend into the trap, and the interstices must be sufficiently large to permit ready escape of worker bees which may happen to enter the trap. The upper closure member 34 may be held closed in any conventional manner as by a simple spring catch 38 engaging the bars of the front grid 37.

The ends of the grids 29 and 37 may be received in grooves 41 and 42 in the end plates.

The bottom of the trap chamber is constituted by a rectangle of wire screening or the like 43 folded to form a front dihedral 44 and a rear dihedral 46. The front and rear edges of the screen 43 are secured to the lower edges of the front and rear cross members in any conventional manner, as by tacks 47, so that the screen 43 closes the bottom of the trap. The central angle of the screen is fixed to the top of the grid 29, which may be effected by laying a wire 48 in the groove and tying it to the grid 32, as by wire 49. The top edges of the screen 43 are pierced at numerous points to provide entrances 51 into the trap. This may be effected by simply spreading the wires with a sharp instrument to provide holes sufficiently large for the passage of drones and queens.

The openings may be approximately three-eighths of an inch in diameter and are preferably relatively numerous, being spaced about 1¼ to 1½ inches apart.

The principle of operation of the trap is well understood. The bees which are unable to pass through the barrier 29 will climb the screen and pass through the openings 51. Once inside the trap they will be unable to escape.

As will be seen, this action will occur whether a drone is attempting to enter or leave the hive, and thus visiting drones are trapped with great facility.

If desired, a clean-out opening 56 may be provided in either end wall of the trap closed by plate 57 pivoted on a screw 58. It will generally be preferred, however, to open the top to clean the trap.

Drones and queens caught in the trap may, of course, be removed at the pleasure of the beekeeper. The workers may readily escape through the grids 34 and 37.

Many variations of the structural embodiment of the invention may be made within the scope thereof and the description herein of the preferred embodiment is not to be considered as restrictive of the scope of the invention, which is defined by the appended claims.

This application is a substitute for my abandoned application Serial No. 784,810, filed November 8, 1947.

I claim:

1. A drone trap adapted for attachment against the entrance of a beehive, the trap being divided into an upper section and a lower section, the lower section defining a passage into the hive entrance, a barrier formed with openings large enough for passage of worker bees but too small for passage of drones and queens disposed across the passage, means on both sides of the barrier comprising a screen extending between the sections attached to the barrier and having openings therein on either side of the barrier providing access from the lower section to the upper section for drone and queen bees, adapted to prevent return movement thereof, the upper section constituting a trap for drones and queens.

2. A drone trap adapted for attachment against the entrance of a beehive, the trap comprising a generally box-like structure, a partition dividing the trap into an upper section and a lower section, the lower section defining a passage into the hive entrance, a barrier formed with openings large enough for passage of worker bees but too small for passage of drones and queens disposed across the passage, means in the partition on both sides of the barrier providing access from the lower section to the upper section for drone and queen bees, adapted to prevent return movement thereof, the upper section constituting a trap for drones and queens and being provided with openings for entrance of light and escape of worker bees.

JOSEPH WINKLBAUER.

REFERENCES CITED

The following references are of record in the file of this patent:

UNITED STATES PATENTS

| Number | Name | Date |
|---|---|---|
| 307,737 | Alley | Nov. 11, 1884 |
| 565,353 | Hill | Aug. 4, 1896 |
| 593,712 | Williams | Nov. 16, 1897 |

FOREIGN PATENTS

| Number | Country | Date |
|---|---|---|
| 86,068 | Austria | Oct. 25, 1921 |